(12) United States Patent
Perini et al.

(10) Patent No.: US 6,955,087 B2
(45) Date of Patent: Oct. 18, 2005

(54) PRESSURE TRANSDUCER WITH CAPILLARY TUBE FOR HIGH PRESSURE MEASURES

(75) Inventors: Marcello Perini, Castegnato (IT); Andrew Wilson, Bolton, MA (US); Federico Lanzani, Azzano Mella (IT); Maria Teresa Milesi, Brescia (IT)

(73) Assignee: Gefran Sensori, S.r.l., (IT)

( * ) Notice: Subject to any disclaimer, the term of this patent is extended or adjusted under 35 U.S.C. 154(b) by 20 days.

(21) Appl. No.: 10/686,155

(22) Filed: Oct. 15, 2003

(65) Prior Publication Data
US 2005/0072241 A1    Apr. 7, 2005

(30) Foreign Application Priority Data
Oct. 15, 2002    (EP) .................................. 02425631

(51) Int. Cl.[7] .............................................. G01L 7/08
(52) U.S. Cl. ........................................... 73/706; 338/4
(58) Field of Search ..................... 73/706, 730, 726, 73/756, 721, 727, 700, 708; 338/4, 2

(56) References Cited

U.S. PATENT DOCUMENTS

| 2,420,148 | A |  | 5/1947 | Ostergren | |
|---|---|---|---|---|---|
| 3,349,623 | A |  | 10/1967 | Pastan | |
| 3,645,136 | A |  | 2/1972 | Calhoun | |
| 4,625,559 | A | * | 12/1986 | Carter et al. | 73/706 |
| 4,679,438 | A | * | 7/1987 | Wareham | 73/726 |
| 4,680,972 | A | * | 7/1987 | Wareham | 73/730 |
| 4,702,113 | A | * | 10/1987 | Wareham | 73/706 |
| 4,712,430 | A | * | 12/1987 | Wareham | 73/706 |
| 4,858,471 | A | * | 8/1989 | Wareham | 73/706 |

FOREIGN PATENT DOCUMENTS

| EP | 0 187 385 | 7/1986 |
|---|---|---|
| GB | 1023433 | 3/1966 |

* cited by examiner

Primary Examiner—William Oen
Assistant Examiner—Andre Allen
(74) Attorney, Agent, or Firm—Akerman Senterfitt

(57) ABSTRACT

A pressure transducer with a capillary tube filled with a fluid for high pressure measurements. The pressure transducer has a sensitive element formed with a bore defining a cylindrical sensitive chamber, and respective capillary tubes attached to either ends of the sensitive element in fluid communication with the sensitive chamber. Advantageously, each capillary tube has a respective end outside threaded to engage in a mating thread-way provided in the sensitive element; moreover, a perimeter weld is provided for safety around each capillary tube near the connection to the sensitive element.

11 Claims, 2 Drawing Sheets

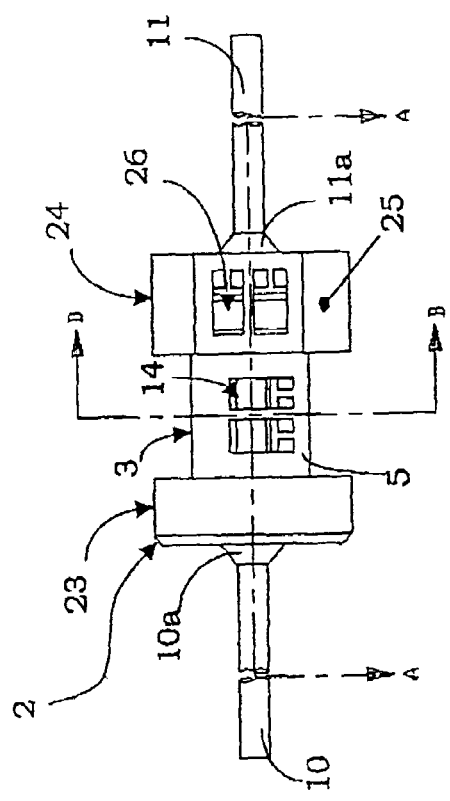
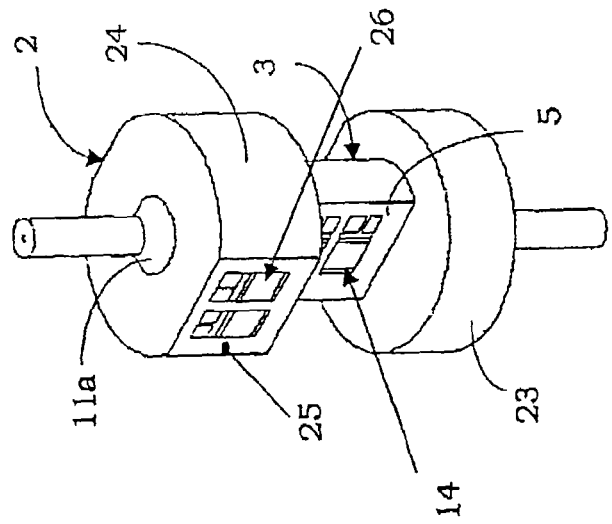
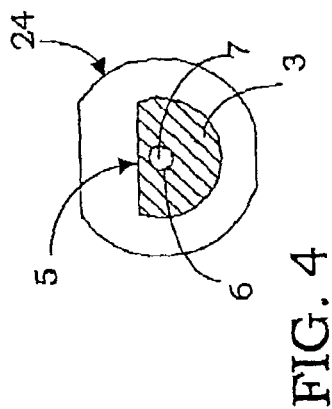
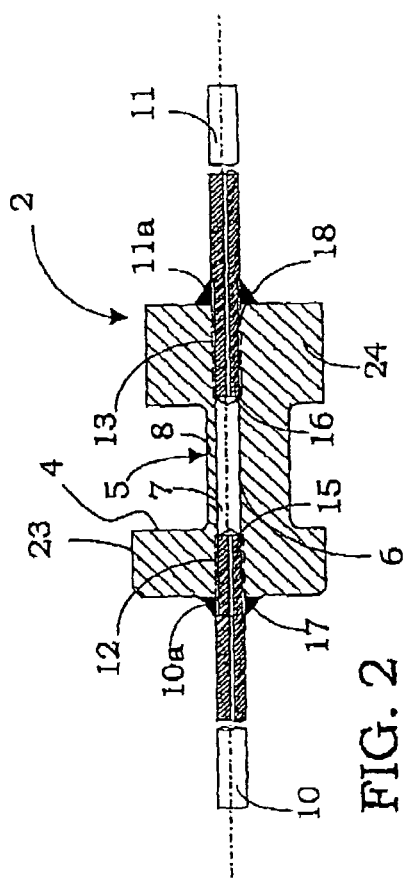
FIG. 1
FIG. 3
FIG. 2
FIG. 4

PRESSURE TRANSDUCER WITH CAPILLARY TUBE FOR HIGH PRESSURE MEASURES

DESCRIPTION

1. Field of Application

The present invention relates to a pressure transducer, and particularly to a fluid-filled transducer for high-pressure measurements, of the type comprising a capillary tube filled with a pressurised fluid and a deformable sensing element, the latter in fluid communication with the capillary tube and associated with deformation sensing means.

Although not limited to, the invention relates in particular to a transducer as above, which comprises a measuring chamber having at least one wall adapted to become deformed by the pressurised fluid and being associated with deformation sensing means, such as strain gages, for measuring the extent of the deformation and correspondingly issuing a correlated electric signal indicative of pressure level. For convenience of explanation only, this is the application field to which the complement of this description will make reference.

2. Prior Art

As the skilled technicians in the art well know, pressure transducers of the above type are used for measuring high pressures in a broad range of values, e.g. between 700 and 2000 bar, on plastics injection moulding equipment.

A transducer of this type, viz. a transducer comprising a capillary tube filled with a pressurised fluid, is known inter alia from U.S. Pat. No. 3,349,623, wherein a transducer provided with an annular measuring chamber and associated strain gages is disclosed.

An improvement on that transducer is disclosed in European Patent No. 0 187 385, in which a pressure transducer of elongate design includes a sensing element 12 bored to receive a capillary tube 14. The capillary tube 14 and the sensing element 12 define in combination an annular measuring chamber 28 placed in fluid communication with the capillary tube.

The sensing element 12 has a thin wall 46 formed with a sensitive surface 48 which extends parallel to the capillary tube 14, deformation sensing means in the form of strain gages being associated with the sensitive surface 48.

To provide the annular chamber 28, the wall of the capillary tube 14 that spans the bore in the sensing element is precision machined to form a perimeter recess 26 defining the annular chamber in combination with the bore wall.

This prior approach is highly complicated and a costly construction to manufacture, apt to yield a highly expensive transducer.

U.S. Pat. No. 4,858,471 discloses a transducer that comprises a pair of capillary tubes fitted at either ends of the sensitive element, and a cylindrical sensitive chamber in the sensitive element, the chamber being in fluid communication with the capillary tubes.

Provided inside the sensitive chamber is a fill rod defining an annular chamber which is bound to have a fluid space of reduced size.

The last-mentioned approach provides for the capillary tubes to be secured in either ends of the sensitive element by welding. This usually requires some crucial processing to prepare the end portion of the sensitive element for receiving the capillary tube.

The welds made for attaching the capillary tubes to the sensitive element are prone on failing under the high working pressures involved, and directly put the transducer out of use. Such a failure can not be repaired; thus the transducer must be replaced causing cost losses and downtime.

The underlying technical problem of the present invention is to provide a capillary tube type of pressure transducer with appropriate structural and functional features for the safe attachment of the capillary tubes to the sensitive element, for the transducer overall performance improvement, and for the transducer manufacturing costs reduction.

SUMMARY OF THE INVENTION

The solution on which the invention is based is to provide the capillary tubes to be attached to the sensitive element with a threaded end for screw engagement into threaded sockets correspondingly provided in either ends of the sensitive element. Having the capillary tubes so connected to the sensitive element enables the tubes to withstand higher pressures and a cylindrical measuring chamber of smaller diameter to be used in the sensitive element which will contain a smaller amount of the fluid.

Based on this idea, the technical problem is solved by a pressure transducer as previously indicated and as defined in Claim 1 and followings.

The features and advantages of the transducer according to this invention should become better understood from the following description of an embodiment thereof, given by way of non-limiting example with reference to the accompanying drawings.

BRIEF DESCRIPTION OF THE DRAWINGS

FIG. 1 shows a front schematic view depicting a pressure transducer according to the invention.

FIG. 2 shows a longitudinal sectional view of the transducer shown in FIG. 1, taken along line A—A.

FIG. 3 shows a perspective schematic view of the transducer shown in FIG. 1.

FIG. 4 shows a cross-sectional view of the transducer of FIG. 1, taken along line B—B.

DETAILED DESCRIPTION

Figure 5:
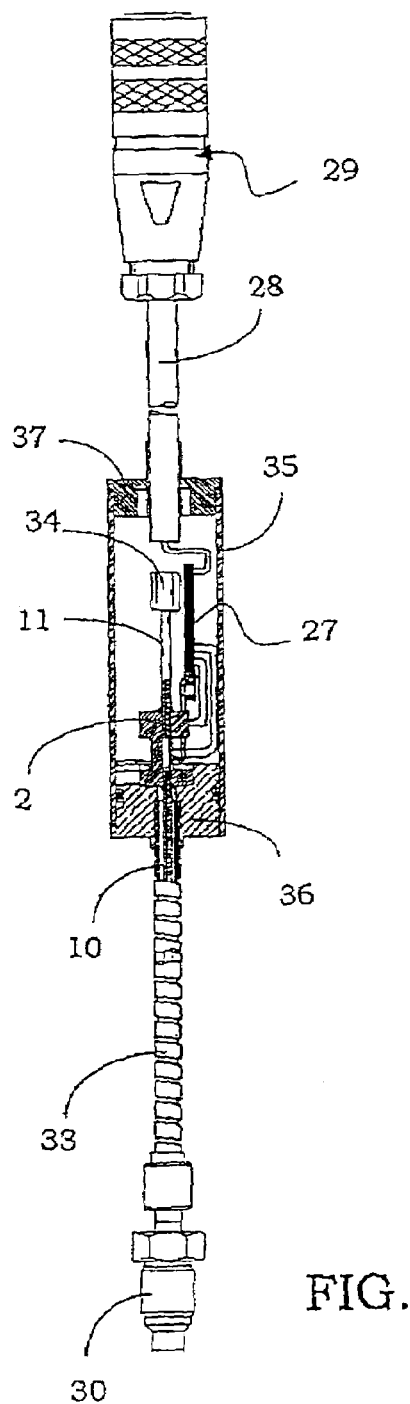
FIG. 5 shows a cut-away view schematically depicting the transducer of FIG. 1 and its connecting elements to plastics injection equipment.

With reference to the drawings, a capillary tube type of pressure transducer according to this invention is generally shown at 1 in schematic form, the transducer 1 being designed for measuring high pressure values, e.g. in the 700 to 3500 bar range.

The transducer 1 comprises an external structure of essentially elongate tubular shape showing a bulge at the location of a sensitive element 2.

The sensitive element 2 is substantially cylindrical in shape with a recessed mid-portion 3 where a cutout 4 defines a flat 5 forming the cutout bottom surface.

More particularly, the sensitive element 2 has three substantially cylindrical portions: two end portions 23, 24, and a mid-portion 3. The flat surface 5 in the cylindrical mid-portion 3 mounts deformation sensors 14 and a flat surface 25, provided in one 23 of the cylindrical end portions (hereinafter, the top end portion), mounts more deformation sensors 26.

The sensors 14 and 26 co-operate to form a bridge circuit for the deformation sensors which are insensitive to changes in temperature.

A cylindrical bore 6 substantially extends axially through the sensitive element 2 and defines a cylindrical sensitive chamber 7 in the above-mentioned mid-portion 3.

The sensitive chamber locates directly beneath the flat 5, from which it is separated by a thin partition 8.

Capillary tubes, or capillary tube sections 10 and 11 are fitted at opposed ends of the sensitive element 2 in fluid communication with the sensitive chamber 7. The capillary tubes 10, 11 are mounted in correspondence with end portions 9 jutting at opposed ends of the sensitive element 2.

Advantageously in this invention, each end 15, 16 of each capillary tube 10, 11 reaching inside the sensitive element 2 is outside threaded at 17, 18.

The outside threads 17, 18 of each end 15, 16 engage in respective thread-ways 12, 13 of the bore 6 from opposed ends of the sensitive element 2.

In other words, each end 15, 16 will be threaded into its mating thread-way socket 12, 13 provided in the sensitive element 2.

Thus, the transducer strength and tightness under pressure are greatly improved since the strain from the pressure is no longer taken by a welded connection, as in conventional transducers, but mainly by a threaded connection.

In addition, the bore 6 can have a smaller diameter "d" than in conventional transducers. In particular, the diameter "d" of the bore 6 can be in the range of 1 to 2.5 mm, preferably not larger than 1.25 mm.

Advantageously, a peripheral safety weld 10a, 11a can be made around each capillary tube 10, 11 where it enters the sensitive element 2, as shown in FIG. 1.

The welds 10a, 11a only function to improve the tightness of the sensitive chamber 7.

Advantageously, the ends 15, 16 of the capillary tubes 10, 11 should stop in their threaded sockets 12, 13 short of the interior of the sensitive chamber 7, so as to leave the chamber unencumbered by their extremities.

Of course, the flat surface 5 would accommodate the deformation sensors 14, e.g. in the form of strain gages, these sensors being arranged to sense the mechanical deformation of the flat surface 5 under the pressure presently prevailing in the sensitive chamber 7 and provide a measurement of that pressure. The other deformation sensors 26 attached to the flat 25 form, with the sensors 14, a bridge type of circuit that is insensitive to changes in temperature.

A printed circuit board 27, shown in FIG. 5, carries circuitry for initially processing and conditioning the electric signals from the deformation sensors 14 and 26. The board 27 is connected to the sensors 14, 26 and to electrical output connections 28 taken to a connector 29, as shown in FIG. 5.

In another embodiment, not shown, at opposed ends of the inlet to the recess 4 two lowered steps are provided, such to form an inset seat for receiving a printed circuit board in place of the PC board 27. This has an important advantage in that the sensing electronics can be mounted to the sensor itself for more convenient connection to the electric signal detecting and processing means by simple electric connections.

It will be appreciated from the foregoing description that the transducer of this invention does solve the technical problem. It has been uniquely successful in withstanding, and in providing optimum performance at, pressures of up to 3500 bar.

Furthermore, the transducer will be long-lived even under dynamic conditions and positively tight on account of the welds being practically relieved of mechanical strains.

In addition, reliable performance is to be expected of it, because its construction includes but very simple parts connected together in a simple manner.

The transducer of this invention can be manufactured in large volumes at moderate costs, because it requires but simple assembly procedures and no complicated or crucial machining operations for making its components or the sensitive chamber.

The simple construction and simple connections of the capillary tubes to the sensitive element enable the diameter of the bore 6 and its sensitive chamber 7 to be small, so that a smaller amount of fluid can be raised to high pressure values.

Finally, the particular compactness of the sensor of this invention allows the sensor to be particularly suitable to replace sensors of possibly inferior performance, thanks to the simple connection to the electronic portion, pre-assembled to the sensor.

Figure 6:
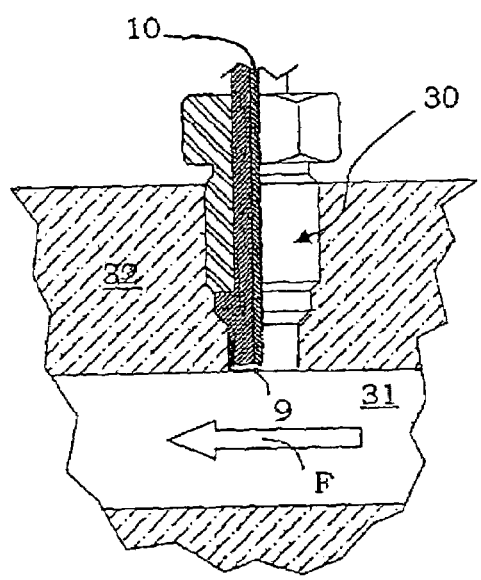
FIG. 6 shows a cross-sectional view of a detail of FIG. 5.

In regard to this, reference can be made to the examples of FIGS. 5 and 6, which highlight the simple construction of the transducer 1 as a whole, as well as that of the connecting elements for its installation.

The sensitive element 2 is mounted inside a cylindrical case 35 which is closed at either ends by plugs 36, 37, through one of which the capillary tube 10 is led at one end, and through the other of which the electric connections 28 are passed, at the other end. The board 27 is also mounted inside the case 35, on a bracket 38 extending parallel to the axis of the sensitive element 2.

It should be added to the foregoing that the capillary tube 10 is under a flexible protective sheath 33 and the other capillary tube or fill tube 11 terminated with a plug 34.

The end of the capillary tube 10 opposite to the sensitive element 2 is terminated with a fitting 30 for connecting a nozzle 32, partly visible in FIG. 6, to a pressurised chamber 31. The nozzle 32 is a part of injection moulding equipment, not shown because conventional.

The fitting 30 opens into the chamber 31 through a small corrugated membrane 9 that constitutes the element in contact with the process fluid, viz. the element called upon to bear the pressure of process fluid flowing in the direction of arrow F.

Advantageously, with the small size of the capillary tube 10 allowed by the small diameter of the bore 6 through the sensitive element 2, the small membrane 9 can also have smaller dimensions, e.g. no more than 6 mm in diameter, than those currently used in high pressure transducers according to the prior art.

This is advantageous in applications where the installation space made available to the whole sensor, in particular the contact element, is quite limited, as is the case with injection moulding equipment.

What is claimed is:

1. A pressure transducer with a capillary rube filled with a fluid for high pressure measurements, said pressure transducer comprising
   a sensitive element formed with a bore to define a cylindrical sensitive chamber, and
   respective capillary tubes attached to either ends of the sensitive element in fluid communication with the sensitive chamber,
   wherein each capillary rube has a respective end outside threaded to engage in a mating thread-way provided in the sensitive element, a perimeter weld being provided for safety around each capillary tube near the connection to the sensitive element.

2. A pressure transducer according to claim 1, wherein at least a thread-way is formed in the bore.

3. A pressure transducer according to claim 1, wherein said sensitive element essentially comprises three cylindrical portions.

4. A pressure transducer according to claim 1, wherein the ends of the capillary tubes extend into the respective sockets threaded along a track that does not interfere with the interior of the sensitive chamber.

5. A pressure transducer according to claim 1, wherein the sensitive element comprises a flat surface lying parallel to said sensitive chamber being separated from said sensitive chamber by a thin partition.

6. A pressure transducer according to claim 5, wherein said flat surface accommodates deformation sensors.

7. A pressure transducer according to claim 5, wherein the sensitive element is substantially cylindrical in shape, and wherein said flat surface defines the bottom of a recess formed at the middle of the sensitive element.

8. A pressure transducer according to claim 1, wherein the end of a capillary tube opposite to said sensitive element carries a fitting for connection to a pressurised chamber of an injection moulding machine, and wherein said fitting has a small membrane in contact with a fluid for the injection process.

9. A pressure transducer according to claim 8, wherein said small membrane has a diameter of 6 mm.

10. A pressure transducer according to claim 1, comprising a printed circuit board mounting electronic circuitry for detecting and/or processing the electric signal transmitted by said deformation sensors, said PC board extending parallel to the axis of the sensitive element inside a protective case.

11. A pressure transducer according to claim 3, wherein said three cylindrical portions comprise two end portions and a mid-portion formed with a flat surface for accommodating deformation sensors, with a second flat surface being formed in one of the end portions for accommodating additional deformation sensors.

* * * * *